(12) United States Patent
Nakanishi et al.

(10) Patent No.: US 7,450,155 B2
(45) Date of Patent: Nov. 11, 2008

(54) IMAGE CAPTURING APPARATUS (75) Inventors: Hideaki Nakanishi, Mishima-gun (JP);
Hideki Morinaga, Hachioji (JP);
Kazuhiko Kojima, Kawachinagano (JP);
Tougo Teramoto, Wakayama (JP);
Hiroaki Hasegawa, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 763 days.

(21) Appl. No.: 11/080,874

(22) Filed: Mar. 15, 2005

(65) Prior Publication Data
US 2006/0087562 A1   Apr. 27, 2006

(30) Foreign Application Priority Data
Oct. 26, 2004   (JP)   ............................. 2004-310890

(51) Int. Cl.
*H04N 5/228*   (2006.01)
*H04N 5/262*   (2006.01)
(52) U.S. Cl. .................................. 348/208.5; 348/240.1
(58) Field of Classification Search .............. 348/208.5, 348/240.1, 208.99, 208.2, 208.4, 208.6, 208.7, 348/208.8, 208.11, 208.12, 240.99; 359/554
See application file for complete search history.

(56) References Cited

U.S. PATENT DOCUMENTS

| | | | | |
|---|---|---|---|---|
| 5,825,415 A | * | 10/1998 | Kaneda et al. | 348/208.6 |
| 5,867,213 A | * | 2/1999 | Ouchi | 348/208.5 |
| 6,046,768 A | * | 4/2000 | Kaneda et al. | 348/208.2 |
| 6,172,707 B1 | * | 1/2001 | Ouchi et al. | 348/208.6 |
| 6,396,538 B1 | * | 5/2002 | Kobayashi et al. | 348/240.99 |
| 2005/0104994 A1 | * | 5/2005 | Morimoto | 348/345 |

FOREIGN PATENT DOCUMENTS

| | | | | |
|---|---|---|---|---|
| JP | 7-123317 | A | | 5/1995 |
| JP | 9-102903 | A | | 4/1997 |
| JP | 09102903 | A | * | 4/1997 |
| JP | 10-51699 | A | | 2/1998 |
| JP | 2000-69351 | A | | 3/2000 |
| JP | 2002-27312 | A | | 1/2002 |
| JP | 2002-182260 | A | | 6/2002 |

OTHER PUBLICATIONS

Japanese "Notice of Reason(s) for Refusal", dated Jun. 5, 2007, for counterpart Japanese Patent Application No. 2004-310890; along with an English-language translation thereof.

* cited by examiner

*Primary Examiner*—Lin Ye
*Assistant Examiner*—Jason Whipkey
(74) *Attorney, Agent, or Firm*—Sidley Austin LLP (57) ABSTRACT

The image capturing apparatus extracts and records an effective image Ap from a captured image Ao obtained by imaging of incident light from a subject on an image capturing element by an optical system composed of optical members. When an angle of view of an image that is to be recorded is large, the image capturing apparatus adjusts an angle of view of the effective image Ap by an optical zoom unit and records the effective image Ap while correcting camera shake by a mechanical camera-shake correction unit. Only when a magnification of the optical zoom unit for the captured image Ao is maximal, the image capturing apparatus further adjusts the angle of view of the effective image Ap by an electronic zoom unit and records the effective image Ap while correcting camera shake by an electronic camera-shake correction unit.

4 Claims, 9 Drawing Sheets

IMAGE CAPTURING APPARATUS

RELATED APPLICATION

This application is based on Japanese Patent Application No. 2004-310890, the content of which is incorporated herein by reference.

BACKGROUND OF THE INVENTION

The present invention relates to an image capturing apparatus such as digital camera and video camera.

In an image capturing apparatus that converts into electric signal an image formed on an image capturing element such as CCD and that thereby records the image, in general, incident light from a subject is imaged on the image capturing element by an optical system composed of optical members, and an effective image formed on an effective part of the image capturing element is converted into electronic data and is then recorded. That is why both a number of pixels of the image capturing element and a number of effective pixels of the effective part are inscribed on commodity products.

For purpose of obtaining an enlarged image with a reduced angle of view in an image capturing apparatus, conventionally, there have publicly been known an optical zoom unit that moves at least one optical member of an optical system, thereby enlarges an image on the image capturing element, and records the enlarged image, and an electronic zoom unit that extracts part of an image on the image capturing element and records the enlarged image. There have been provided a large number of image capturing apparatus in which both the units are used.

For weakening so-called camera-shake that is shake of an image captured by an image capturing apparatus held by human hand, there have publicly been known a mechanical camera-shake correction unit that detects an amount of shake of the image capturing apparatus, moves part of an optical system and/or an image capturing element, and thereby carries out correction so as to prevent an image of a subject formed on the image capturing element from moving in course of image capture, and an electronic camera-shake correction unit that monitors change of image data with lapse of time and shifts an area where the image is extracted so as to reduce an amount of movement of the image of the subject in the extracted image.

In Japanese Patent Laid-Open Publication No. 2000-69351, No. H07-123317, and No. 2002-27312 are disclosed image capturing apparatus having both the mechanical camera-shake correction unit and the electronic camera-shake correction unit.

In Japanese Patent Laid-Open Publication No. 2000-69351 are disclosed an image capturing apparatus that performs correction with use of the electronic camera-shake correction unit when dynamic images are recorded and that performs correction with use of the mechanical camera-shake correction unit when still picture images are recorded, and an image capturing apparatus that uses only the electronic camera-shake correction unit when images are displayed on a monitor without being recorded and that uses the mechanical camera-shake correction unit and the electronic camera-shake correction unit in combination when images are recorded.

In Japanese Patent Laid-Open Publication No. H07-123317 is disclosed an image capturing apparatus that reduces power consumption by correction with use of the mechanical camera-shake correction unit when an angle of view is small and by correction with use of the electronic camera-shake correction unit when the angle of view is large.

In Japanese Patent Laid-Open Publication No. 2002-27312 is disclosed an image capturing apparatus that clearly captures consecutive images with use of the mechanical camera-shake correction unit and that corrects positional shift of an image of a subject between the consecutive images with use of the electronic camera-shake correction unit.

As disclosed in Japanese Patent Laid-Open Publication No. 07-123317, the mechanical camera-shake correction unit consumes large power and thus causes problems of decrease in maximum number of captured images or in maximum length of time of image capture, heat generation and the like. Capture of dynamic images particularly makes the problems enormous. In comparison with a large angle of view for image capture, furthermore, a small angle of view (with high magnification) necessitates larger movement of part of an optical system or an image capturing element and thus makes the problem more remarkable.

Though the electronic camera-shake correction unit does not cause the problems of power consumption, heat generation, and the like, on the other hand, it requires an image to be extracted partially from a captured image. Therefore, a problem occurs in that a resolution of the image effectively obtained is lowered in order to ensure a movable range of an area to be extracted. When a wide-angle image is to be captured, on the other hand, a problem occurs in that a maximum angle of view is limited to a small value in order to ensure a movable range of an area to be extracted.

SUMMARY OF THE INVENTION

In consideration of the problems, an object of the present invention is to provide an image capturing apparatus of which general power consumption is small and by which camera shake can be corrected with highest possible resolution instead of decrease in resolution, maximum angle of view or the like.

In order to resolve the problems, according to the present invention, in a first aspect of the invention, there is provided an image capturing apparatus with an optical system composed of optical members for forming an image of a subject, the image capturing apparatus including:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit adjusts the angle of view by optical zooming and records the effective image while carrying out camera-shake correction with use of the mechanical camera-shake correction unit until a magnification of the optical zoom unit for the captured image is maximized, and the control unit adjusts the angle of view by electronic zooming and records the effective image while carrying out camera-shake correction with use of the electronic camera-shake correction unit after until the magnification of the optical zoom unit for the captured image is maximized.

In accordance with this configuration, a high-resolution image with maximal utilization of all of effective pixels of the image capturing element as the effective image can be recorded with camera-shake correction carried out by the mechanical camera-shake correction unit when the angle of view is adjusted by the optical zoom unit, and power consumption can be reduced by camera-shake correction with change in the position of the extraction of the effective image when the angle of view is adjusted by the electronic zoom unit.

In a second aspect of the invention, there is provided an image capturing apparatus with an optical system composed of optical members for forming an image of a subject, the image capturing apparatus including:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit corrects camera shake by the mechanical camera-shake correction unit and records the image when a ratio in size of the effective image to the captured image is larger than a given value, and the control unit corrects camera shake by the electronic camera-shake correction unit and records the image when the ratio in size of the effective image to the captured image is not larger than the given value.

In accordance with this configuration, camera shake is corrected with use of the mechanical camera-shake correction unit when the ratio in size of the effective image to the captured image is larger than the given value, because then sufficient camera-shake correction cannot be achieved by the electronic camera-shake correction unit. When the ratio in size of the effective image to the captured image is not larger than the given value, camera shake is corrected by the electronic camera-shake correction unit. Thus both sufficient camera-shake correction and decrease in power consumption for the camera-shake correction can be achieved.

When an angle of view of an image that is to be recorded is large, in the image capturing apparatus in accordance with the second aspect of the invention, the angle of view of the effective image may be adjusted by the optical zoom unit and the effective image may be recorded while camera shake is corrected by the mechanical camera-shake correction unit. Only when a magnification of the optical zoom unit for the captured image is maximal, the angle of view of the effective image may further be adjusted by the electronic zoom unit and the effective image may be recorded.

In accordance with this configuration, a high-resolution image can be obtained by the mechanical camera-shake correction unit and the optical zoom unit when the angle of view of the image that is to be recorded is large, and a magnified image can be obtained with use of the electronic zoom unit when the angle of view is decreased in excess of a capability of the optical zoom unit. In electronic zooming, camera shake is corrected by the electronic camera-shake correction unit without use of the mechanical camera-shake correction unit when the ratio in size of the effective image to the captured image is not larger than the given value, and thus power consumption can be reduced.

When an angle of view of an image that is to be recorded is large, in the image capturing apparatus in accordance with the second aspect of the invention, the angle of view of the effective image may be adjusted by the electronic zoom unit and the effective image may be recorded. Only when the angle of view of the effective image obtained by the electronic zoom unit is minimal, the angle of view of the effective image may further be adjusted by the optical zoom unit and the effective image may be recorded while camera shake is corrected by the electronic camera-shake correction unit.

In accordance with this configuration, camera shake is corrected with use of the mechanical camera-shake correction unit when the ratio in size of the effective image to the captured image is larger than the given value, and thus and the effective image with a wide angle can be recorded. When the ratio in size of the effective image to the captured image is not larger than the given value, camera shake is corrected by the electronic camera-shake correction unit and thus power consumption can be reduced. When the angle of view of the image that is to be recorded is smaller, a magnified image can be obtained by the optical zoom unit and the image without camera shake can be recorded with use of the electronic camera-shake correction unit with low power consumption.

In a third aspect of the invention, there is provided an image capturing apparatus with an optical system composed of optical members for forming an image of a subject, the image capturing apparatus including:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit records the effective image while correcting camera shake by the mechanical camera-shake correction unit when an angle of view of an image to be recorded is larger than a first upper limit angle of view such that a ratio in size of the effective image to the captured image becomes a given first ratio when the angle of view is adjusted by the electronic zoom unit with a minimized magnification of the optical zoom unit for the captured image, the control unit records the effective image while correcting camera shake by the electronic camera-shake correction unit when an angle of view of an image to be recorded is not larger than the first upper limit angle of view, the control unit adjusts the angle of view of the effective image by the electronic zoom unit and records the effective image when an angle of view of an image to be recorded is larger than a second upper limit angle of view such that the ratio in size of the effective image to the captured image becomes a given second ratio when the angle of view is adjusted by the electronic zoom unit with the minimized magnification of the optical zoom unit for the captured image, the control unit fixes the ratio in size of the effective image to the captured image at the second ratio by the electronic zoom unit, adjusts the angle of view of the effective image by the optical zoom unit, and records the effective image when an angle of view of an image to be recorded is not larger than the second upper limit angle of view and larger than a lower limit angle of view such that the ratio in size of the effective image to the captured image becomes the second ratio when the angle of view is adjusted by the electronic zoom unit with the maximized magnification of the optical zoom unit for the captured image, and the control unit fixes the magnification of the optical zoom unit for the captured image at a maximal value, adjusts the angle of view of the effective image by the electronic zoom unit, and records the effective image when an angle of view of an image to be recorded is not larger than the lower limit angle of view.

In accordance with this configuration, images without camera shake can be recorded with use of the mechanical camera-shake correction unit when an angle of view of an image to be recorded is larger than the first upper limit angle of view, and power consumption can be restrained and images without camera shake can be recorded with use of the electronic camera-shake correction unit when an angle of view of an image to be recorded is not larger than the upper limit angle of view. When an angle of view of an image to be recorded is not larger than the second upper limit angle of view and larger than the lower limit angle of view, the effective image without camera shake is obtained with use of the electronic camera-shake correction unit and the angle of view is adjusted by the optical zoom unit with a number of pixels of the effective image held at a maximal value. Thus high-resolution images can be recorded and power consumption can be reduced.

In a fourth aspect of the invention, there is provided an image capturing apparatus with an optical system composed of optical members for forming an image of a subject, the image capturing apparatus including:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit adjusts the angle of view of the effective image by the electronic zoom unit and records the effective image while correcting camera shake by the mechanical camera-shake correction unit when an angle of view of an image to be recorded is larger than a first upper limit angle of view such that a ratio in size of the effective image to the captured image becomes a given first ratio when the angle of view is adjusted by the electronic zoom unit with a minimized magnification of the optical zoom unit for the captured image, the control unit adjusts the ratio of the effective image to the captured image by the electronic zoom unit so that the ratio changes continuously from the first ratio to a second ratio, adjusts the angle of view by the optical zoom unit, and records the effective image while correcting camera shake by the electronic camera-shake correction unit when an angle of view of an image to be recorded is not larger than the first upper limit angle of view and larger than a lower limit angle of view such that the ratio in size of the effective image to the captured image becomes the given second ratio when the angle of view is adjusted by the electronic zoom unit with a maximized magnification of the optical zoom unit for the captured image, and the control unit fixes the magnification of the optical zoom unit at the maximal value, adjusts the angle of view of the effective image by the electronic zoom unit, and records the effective image while correcting camera shake by the electronic camera-shake correction unit when an angle of view of an image to be recorded is not larger than the lower limit angle of view.

In accordance with this configuration also, images without camera shake can be recorded with use of the mechanical camera-shake correction unit when an angle of view of an image to be recorded is larger than the first upper limit angle of view, and power consumption can be restrained and images without camera shake can be recorded with use of the electronic camera-shake correction unit when an angle of view of an image to be recorded is not larger than the upper limit angle of view. When an angle of view of an image to be recorded is not larger than the first upper limit angle of view and larger than the lower limit angle of view, the ratio of the effective image to the captured image is adjusted so that the ratio changes continuously from the first ratio to the second ratio. Thus the effective image without camera shake can be obtained with use of the electronic camera-shake correction unit and images with highest possible resolution can be recorded, in an angle of view that is to be recorded.

In a fifth aspect of the invention, there is provided an image capturing apparatus with an optical system composed of optical members for forming an image of a subject, the image capturing apparatus including:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit carries out adjustment of angle of view with use of the electronic zoom unit in ranges on wide-end side and on telephoto-end side and carries out adjustment of angle of view with use of the optical zoom unit in a middle range when the angle of view is adjusted, and the control unit carries out camera-shake correction with use of the mechanical camera-shake correction unit in an electronic zoom range on the wide-end side in which electronic camera-shake correction cannot be carried out, when camera shake is corrected.

In accordance with the invention, as described above, an image capturing apparatus can be provided of which power consumption is low and which is capable of correcting camera shake without decrease in resolution and maximum angle of view.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
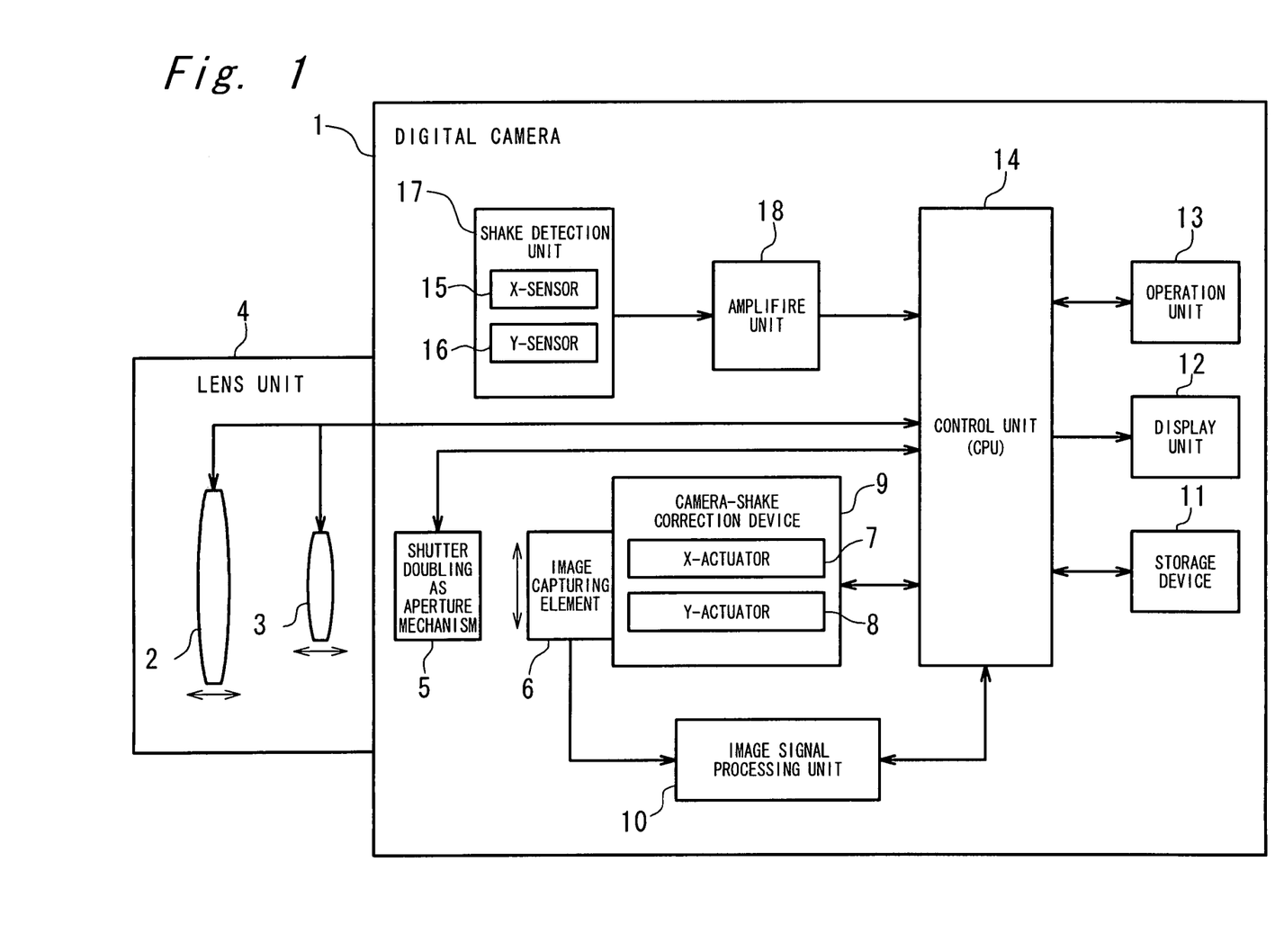
FIG. 1 is a block diagram for a digital camera in accordance with a first embodiment of the invention.

FIG. 1 shows a configuration of a digital camera 1 that is a first embodiment of the invention. On a front face of the digital camera 1 is provided a lens unit (an optical system) 4 composed of a first lens group 2 and a second lens group 3 that are two optical members movable back and forth. At back of the lens unit 4 is provided a shutter doubling as aperture mechanism 5. At back of the shutter doubling as aperture mechanism 5 is provided an image capturing element 6 composed of a CCD, for example. The image capturing element 6 is supported by a camera-shake correction device 9 composed of an X-actuator 7 that moves in horizontal (lateral) directions and of a Y-actuator 8 that moves in vertical directions, so that the image capturing element 6 is capable of moving vertically and horizontally. In the digital camera 1 are provided an image processing unit 10 for processing electric signal converted from an image formed by the image capturing element 6 and thereby producing image data, a storage device 11 in which the image data can be recorded, a display unit 12 that is capable of reproducing and displaying the image on basis of the image data produced by the image processing unit 10 or the image data recorded in the storage device 11, an operation unit 13 for carrying out operation of the digital camera 1 such as instruction of timing with which a user records the image data in the storage device 11 and instruction of zooming power, and a control unit 14 composed of a CPU for controlling operations of above-mentioned components. Besides, there are provided a shake detection unit 17 composed of an X-sensor 15 for detecting a turning angle about a vertical axis of the digital camera 1, that is, a turning velocity thereof in the horizontal directions and a Y-sensor 16 for detecting a turning angle about a horizontal axis, that is, a turning velocity thereof in the vertical directions, and an amplifier unit 18 for amplifying detection signal from the shake detection unit 17 and inputting the signal into the control unit 14.

Figure 2:
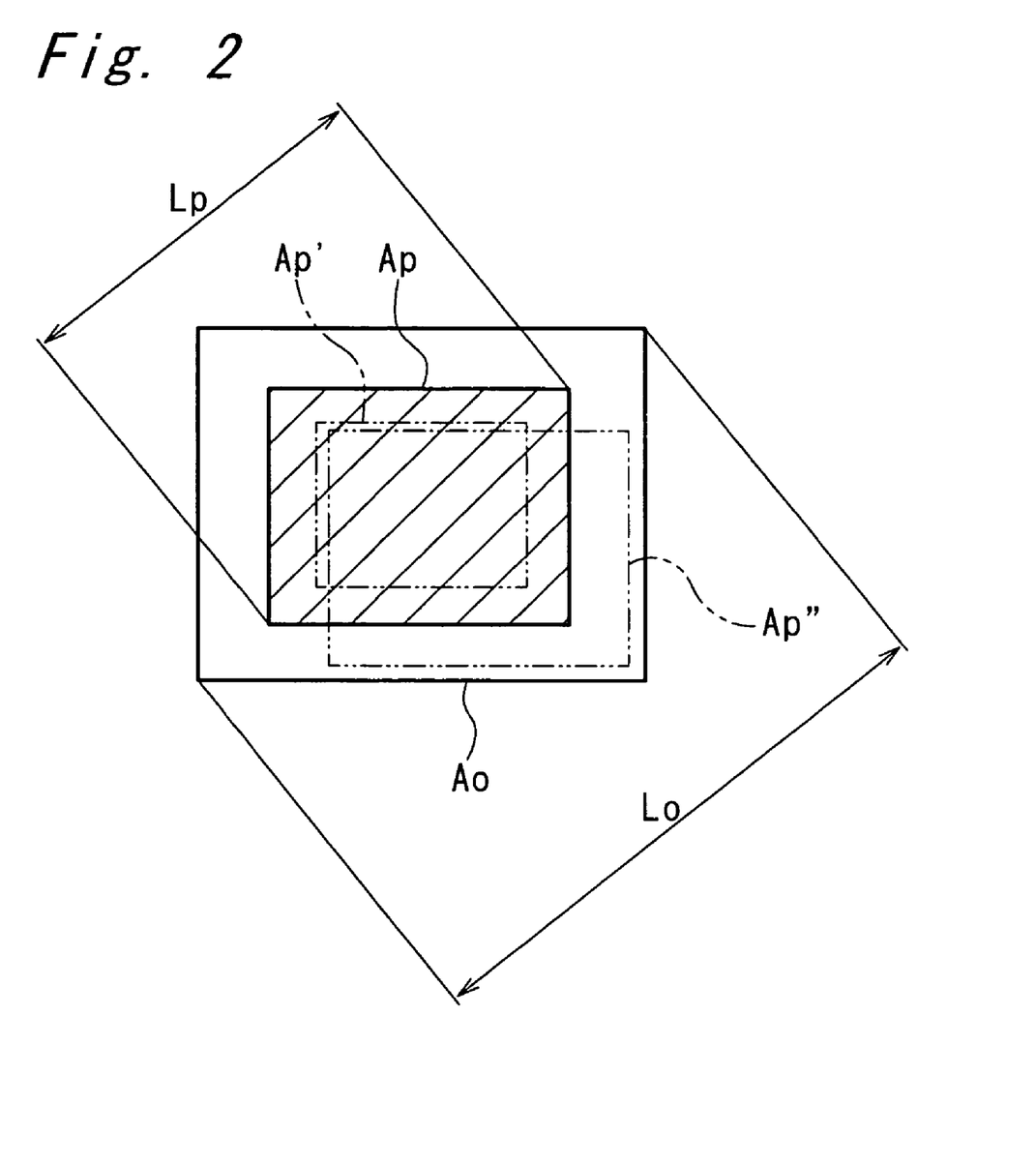
FIG. 2 is a diagram showing a relation between a captured image of an image capturing element and effective images that are extracted from the captured image.

In the digital camera 1 having the configuration described above, the control unit 14 is capable of carrying out optical zooming in which capture images formed on the image capturing element 6 by incident light from a subject are magnified or reduced by movement of the first lens group 2 and the second lens group 3 and in which an angle of view of image data produced in the image signal processing unit 10 is thereby changed, in accordance with instructions from the operation unit 13 (optical zoom unit). As shown in FIG. 2, the image signal processing unit 10 extracts an effective image area as an effective image Ap that has a diagonal length Lp from a captured image Ao that is formed on the image capturing element 6 and that has a diagonal length Lo, and electronic zooming for decreasing an angle of view of image data can be carried out by reduction of the extracted area of the effective image Ap as shown by Ap' in the drawing (electronic zoom unit).

Figure 3:
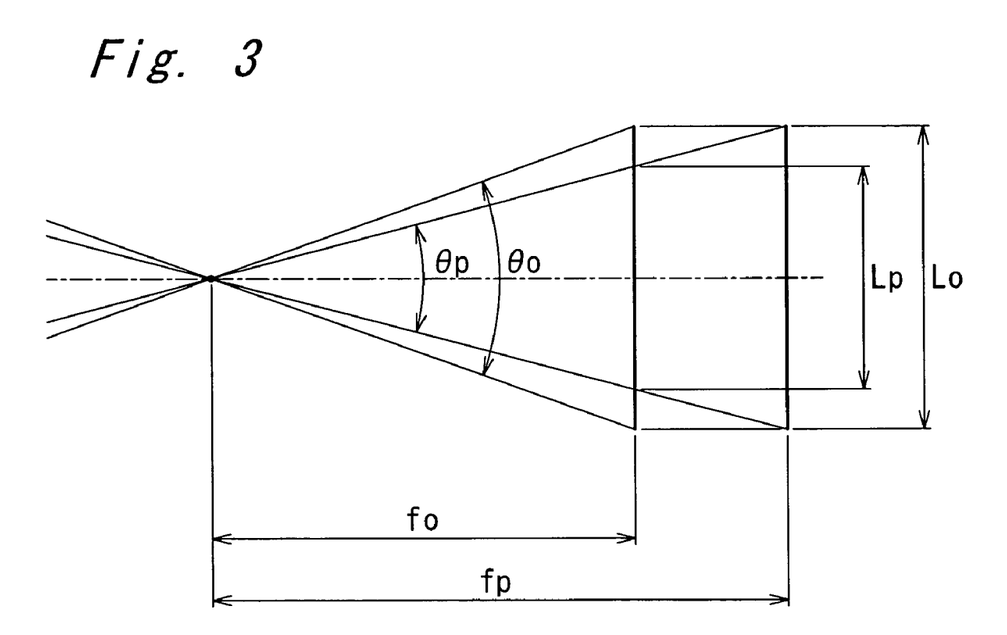
FIG. 3 is a diagram showing a relation between angles of view, focal lengths, and diagonal lengths.

In FIG. 3 is shown a relation between the angles of view and focal lengths in the electronic zooming. Provided that the whole of the captured image can be extracted and made into the effective image Ap, the effective image Ap obtained from the largest extracted area has the diagonal length Lo. With a focal length represented as fo, under this condition, a diagonal angle θo of view satisfies following Equation 1.

$$\tan\frac{\theta o}{2} = \frac{Lo}{2fo} \quad \text{[Equation 1]}$$

Similarly, a diagonal angle θp of view on condition that the effective image Ap has a diagonal length Lp satisfies following Equation 2.

$$\tan\frac{\theta p}{2} = \frac{Lp}{2fo} \quad \text{[Equation 2]}$$

This image is apparently identical to the effective image Ap that has the diagonal length Lo and that is captured with an increased focal length, and thus following Equation 3 holds for the apparent focal length fp.

$$\tan\frac{\theta p}{2} = \frac{Lo}{2fp} \quad \text{[Equation 3]}$$

On basis of the three equations, the apparent focal length fp is represented by following Equation 4.

$$fp = \frac{Lo}{Lp} \cdot fo \quad \text{[Equation 4]}$$

In the digital camera 1, the control unit 14 is capable of moving the image capturing element 6 by actuation of the camera-shake correction device 9 so as to cancel out an amount of shake detected by the shake detection unit 17 (image capturing element shift method) and thereby carrying out mechanical camera-shake correction for reducing movement of an image of a subject on a captured image (the mechanical camera-shake correction unit). As shown in FIG. 2, the image signal processing unit 10 is capable of shifting a position where the effective image Ap is extracted from the captured image Ao, as shown by reference character Ap" in the drawing, and thereby carrying out electronic camera-shake correction for reducing movement of an image of a subject on the effective images Ap and Ap" (the electronic camera-shake correction unit). Other than such an image capturing element shifting method as in the embodiment, publicly known techniques such as camera-shake correction lens shifting method and variable apical angle prism method may be employed for the mechanical camera-shake correction unit.

On condition that 12:1 zoom from a focal length equivalent to 35 mm to a focal length equivalent to 420 mm on 35-mm-film basis can be achieved by optical zooming in the digital camera 1, for example, and that 4:1 zoom from a focal length equivalent to 35 mm to a focal length equivalent to 140 mm can be achieved by electronic zooming with decrease in the diagonal length Lp of the effective image Ap to one-fourth of the diagonal length Lo of the captured image Ao, a focal length equivalent to 1680 mm can be attained at maximum with use of both the methods of zooming. In the digital camera 1, mix of the optical zooming and the electronic zooming and mix of the mechanical camera-shake correction and the electronic camera-shake correction are determined by a focal length f corresponding to an angle of view of an image that is to be captured and recorded.

Figure 4:
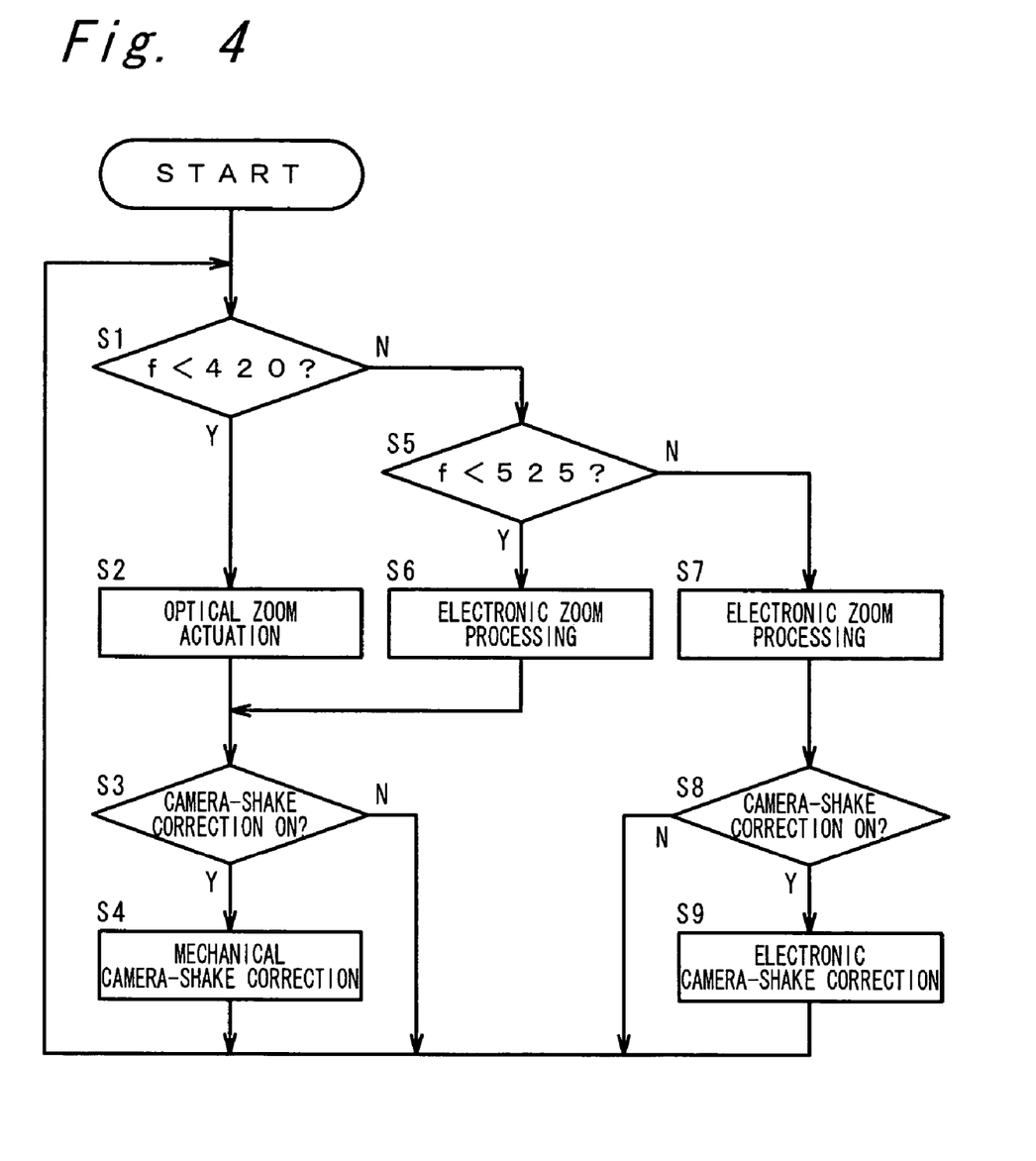
FIG. 4 is a flowchart on application of zooming operations and camera-shake correction methods in the digital camera in accordance with the first embodiment of the invention.

FIG. 4 shows a flowchart on control relating to application of the optical zoom unit and the electronic zoom unit and of the mechanical camera-shake correction unit and the electronic camera-shake correction unit in the digital camera 1. If the focal length f specified by zoom ratio setting means in the operation unit 13 is smaller than 420 mm in a step S1, optical zooming is carried out with actuation of the first lens group 2 and the second lens group 3 in a step S2. If setting has been made so that camera-shake correction is to be carried out, in a step S3, the mechanical camera-shake correction is carried out by the camera-shake correction device 9 in a step S4 and the control returns to the step S1. If the focal length f is not smaller than 420 mm in the step S1, whether the focal length f is smaller than 525 mm or not is judged in the step S5. If the focal length f is smaller than 525 mm, electronic zooming is carried out in which an area extracted for the effective image Ap by the image signal processing unit 10 is a screen area corresponding to a specified focal length, in a step S6. If necessity is then confirmed in the step S3, the mechanical camera-shake correction is carried out in the step S4 and the control returns to the step S1. If the focal length f is not smaller than 525 mm in a step S5, electronic zooming is carried out in a step S7. If setting has been made so that camera-shake correction is to be carried out, in a step S8, the electronic camera-shake correction is carried out in a step S9 with a shift of an area extracted for the effective image Ap by the image signal processing unit 10 and the control returns to the step S1. In the digital camera 1, in this manner, determination of the focal length f and selection of zooming means and camera-shake correction means are constantly carried out during the image capture. In the flowchart, optical zoom actuation is an operation in which only optical zooming is carried out with the ratio of the electronic zooming fixed, and electronic zoom processing is a processing in which a size of the image area to be extracted is changed with the optical zoom fixed (ditto for flowcharts that will be described below).

Figure 5:
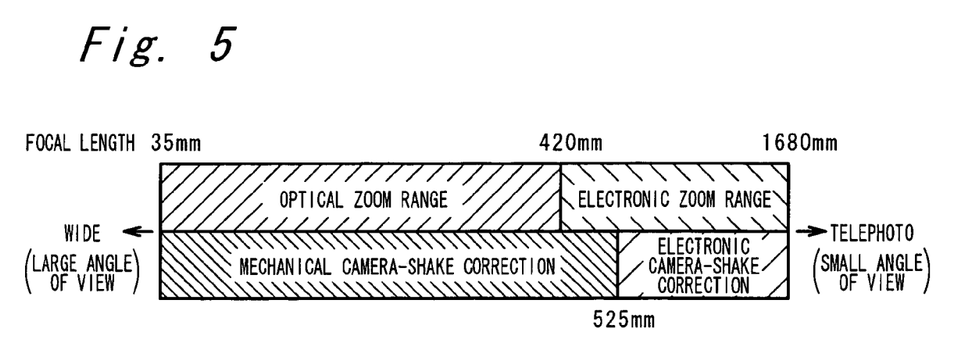
FIG. 5 is a diagram showing ranges of focal lengths of the digital camera of FIG. 4 in which ranges the zooming operations and the camera-shake correction methods are applied.

FIG. 5 shows ranges of focal lengths resulting from the control of FIG. 4 in which ranges the zooming operations and the camera-shake correction methods are applied. In the digital camera 1, optical zooming is carried out when the focal length f is smaller than 420 mm, and electronic zooming is carried out when the focal length f is not smaller than 420 mm. In the range of the focal length f where optical zooming is carried out, the mechanical camera-shake correction is applied. In the range of the focal length f where electronic zooming is carried out, the mechanical camera-shake correction is applied when the focal length f is smaller than a predetermined length (525 mm), and the electronic camera-shake correction is applied only when the focal length f is not smaller than the predetermined length (525 mm). The focal length mentioned in the drawing represents an apparent focal length f as a result of totalization of electronic zooming and optical zooming (ditto for drawings that will be described below).

A reason why the zooming means and the camera-shake correction means are applied as described above in the embodiment and effects of the application will be described below. Initially, electronic zooming has a defect in that a number of pixels of the effective image Ap is smaller than a number of pixels of the captured image Ao, that is, a defect of decrease in resolution of images. On condition that an angle of view of an image to be recorded is large and that the focal length f is small, for this reason, use by priority of optical zooming has an effect of increasing resolution of the obtained image. Mechanical camera-shake correction has a defect of large power consumption. Electronic camera-shake correction, on the other hand, requires change in position of the extraction of the effective image Ap and thus has a defect in that sufficient shift of the extracted area for canceling out shift of an image of a subject and, therefore, satisfactory camera-shake correction cannot be attained unless the effective image Ap is made sufficiently smaller than the captured image Ao. As in the embodiment, accordingly, the decrease in the resolution caused by camera-shake correction can be prevented and power consumption can be decreased by electronic zooming in which the electronic camera-shake correction unit is used only when a ratio in size of the effective image Ap to the captured image Ao is equal to or smaller than a given value.

When electronic zooming is applied in the digital camera 1, the position of the extraction of the effective image Ap can be shifted to a certain extent in the captured image Ao and therefore an effect of camera-shake correction can be expected with use of electronic camera-shake correction, even if the effect is slight. For this reason, camera-shake may be corrected by the mechanical camera-shake correction unit when the angle of view is adjusted by the optical zoom unit, and camera-shake may be corrected by the electronic camera-shake correction unit when the angle of view is adjusted by the electronic zoom unit.

When the angle of view is small as in the digital camera 1 having the focal length f of 420 mm that is a maximum value in optical zooming, however, there is a need to allow for an amount of shake on the order of ±10% relative to the diagonal length Lo. In the digital camera 1, therefore, it is necessary to make the diagonal length Lp of the effective image Ap 20% smaller than the diagonal length Lo in order that the amount of shake may be canceled out with application of the electronic camera-shake correction unit. Substitution of this condition into Equation 4 yields fp=525 mm. That is, camera shake is preferably corrected by the mechanical camera-shake correction unit, even if the angle of view is changed by electronic zooming, when the focal length f is smaller than 525 mm, i.e., when an angle of view of an image to be recorded is larger than an angle of view by which a ratio of the diagonal length Lp of the effective image Ap to the diagonal length Lo of the captured image Ao is caused to be a predetermined value (80/100) with a maximum magnification of optical zooming of the captured image Ao. When the focal length f is not smaller than 525 mm (when the angle of view of the image to be captured is not larger than the angle of view), sufficient camera-shake correction and effective reduction in power consumption can be achieved with application of electronic camera-shake correction.

Though the ratio (80%) of the effective image Ap to the captured image Ao is a sum of the amount of shake determined empirically and a margin, a possibility cannot be nullified that an amount of shake exceeding the designed value may be detected by the shake detection unit 17. In such a case, the larger amount of shake may be corrected with use of the mechanical camera-shake correction unit in addition to the electronic camera-shake correction unit.

A second embodiment of the invention will be described subsequently.

Figure 6:
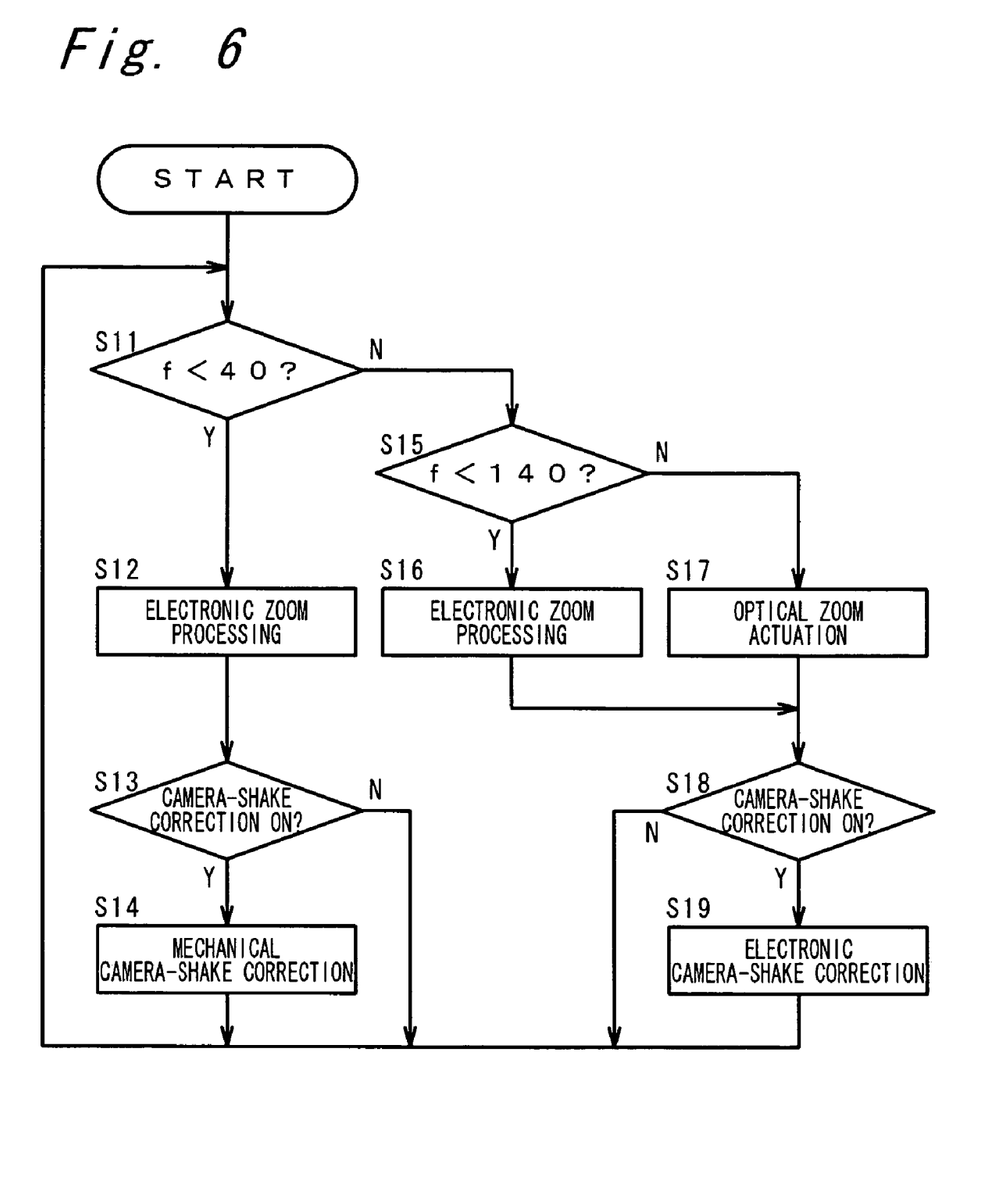
FIG. 6 is a flowchart on application of the zooming operations and the camera-shake correction methods in a digital camera in accordance with a second embodiment of the invention.

The embodiment has a configuration that is the same as the digital camera 1 has and that is shown in FIG. 1, and only control over that is different, as shown in FIG. 6. If the focal length f is smaller than 40 mm in a step S11, in the embodiment, the magnification is changed by electronic zoom processing in a step S12. If setting has been made so that camera-shake correction is to be carried out, in a step S13, the mechanical camera-shake correction is carried out in a step S14 and the control returns to the step S11. If the focal length f is not smaller than 40 mm in the step S1, whether the focal length f is smaller than 140 mm or not is determined in a step S15. If the focal length f is smaller than 140 mm, the electronic zooming processing is carried out in a step S16. If the focal length f is not smaller than 140 mm, optical zooming is carried out in a step S17. If setting has been made so that camera-shake correction is to be carried out, in a step S18, the electronic camera-shake correction is carried out in a step S19 and the control returns to the step S11.

Figure 7:
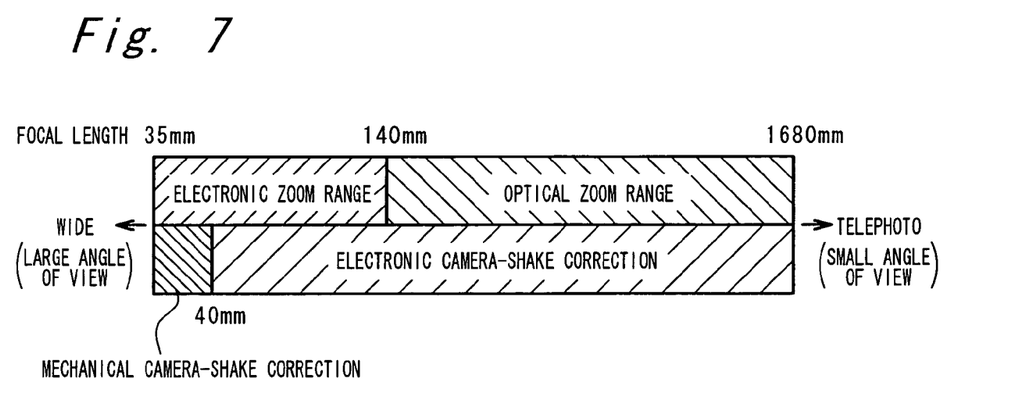
FIG. 7 is a diagram showing ranges of focal lengths of the digital camera of FIG. 6 in which ranges the zooming operations and the camera-shake correction methods are applied.

FIG. 7 shows ranges of focal lengths f resulting from the control of FIG. 6 in which ranges the zooming operations and the camera-shake correction methods are applied. In the embodiment, electronic zooming is carried out when the focal length f is smaller than 140 mm, or optical zooming is carried out when the focal length f is not smaller than 140 mm. Besides, the mechanical camera-shake correction is applied when the focal length f is smaller than 40 mm, or the electronic camera-shake correction is applied when the focal length f is not smaller than 40 mm.

In accordance with the embodiment, the range of the focal length f in which the mechanical camera-shake correction is applied is as small as from 35 mm to 40 mm, and an extremely great effect of reducing power consumption is achieved. On the other hand, use of electronic zooming with priority restricts resolution of obtained images. Accordingly, the embodiment is suitable for situations in which images with high resolution are not required, situations in which increase in duration for consecutive image capture is desired even if resolution of images is sacrificed and the like, e.g., dynamic image capture. In image capturing apparatus capable of capturing both dynamic images and still picture images, in general, dynamic images are often captured with lower resolution. For dynamic image pickup, accordingly, the embodiment can be employed without any influence upon the resolution. Furthermore, the mechanical camera-shake correction is applied for large angles of view, and thus there is required no limitation as described above on the angle of view for ensuring an amount of shift of the effective image Ap.

In the embodiment, in contrast to the first embodiment, the angle of view is adjusted by electronic zooming when the angle of view is large and when the focal length f is short. In order that shake centered on the digital camera 1 in a direction of image capture may sufficiently be canceled out by the electronic camera-shake correction, a difference between the angle of view θo and the angle of view θp is preferably set equal to or larger than a maximum amount of shake in FIG. 3. On condition that the difference between the angle of view θo and the angle of view θp is constant and that the angle θo is smaller than 90°, the smaller focal length fo and the larger angle θo provide the larger ratio of Lp to Lo. In the second embodiment, namely, a distance of the shift of the effective image Ap may be smaller than that in the first embodiment. Therefore, the electronic camera-shake correction can be applied even when the ratio of the diagonal length Lp of the effective image Ap to the diagonal length Lo of the captured image Ao is larger than that in the first embodiment. It is, however, not adequate to enlarge the extracted area simply with the difference between the angle of view θo and the angle of view θp fixed because actual camera-shake contains a shake component of parallel motion in addition to camera-shake in directions of rotation. In the embodiment, the mechanical camera-shake correction is applied when the focal length f is smaller than 40 mm with the ratio of about 88% of the diagonal length Lp of the effective image Ap to the diagonal length Lo of the captured image Ao (on condition that an angle of view of an image to be recorded is larger than an angle of view by which a ratio of the diagonal length Lp of the effective image Ap to the diagonal length Lo of the captured image Ao is caused to be 88% when the angle of view is adjusted by the electronic zoom unit with a minimized magnification of the optical zoom unit for the captured image Ao).

Even if the captured image Ao cannot be enlarged by the lens unit 4 in the embodiment, that is, even if the embodiment has no optical zoom unit, applying the mechanical camera-shake correction for the focal length f smaller than 40 mm and applying the electronic camera-shake correction for the focal length f not smaller than 40 mm are effective for decreasing the angle of view for camera-shake correction and preventing excessive power consumption.

Hereinbelow, a third embodiment of the invention will be described.

Figure 8:
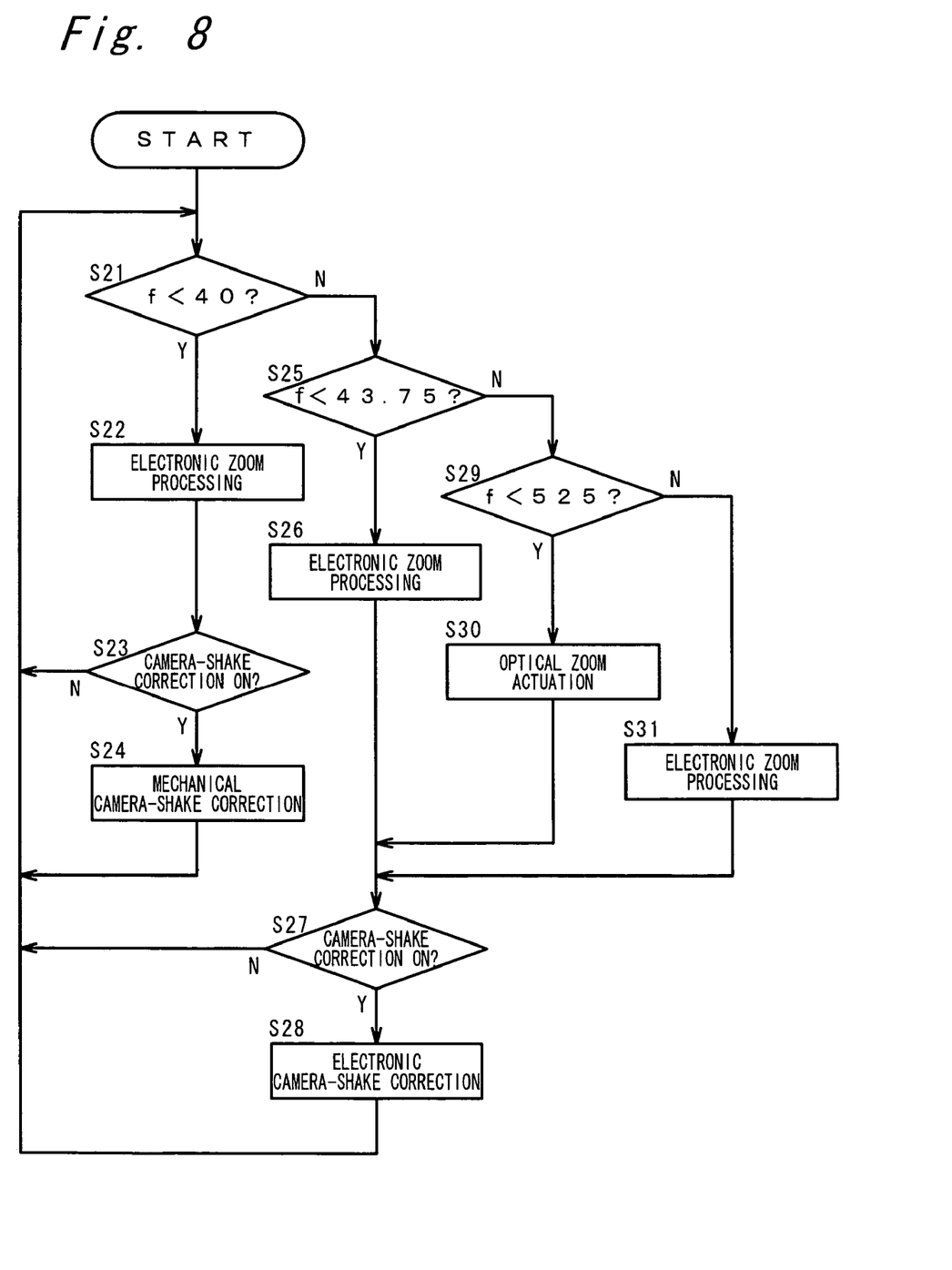
FIG. 8 is a flowchart on application of the zooming operations and the camera-shake correction methods in a digital camera in accordance with a third embodiment of the invention.

The embodiment has a configuration that is the same as the digital camera 1 has, and control over that is different, as shown in FIG. 8. If the focal length f is smaller than 40 mm in a step S21, in the embodiment, the magnification is changed by electronic zoom processing in a step S22. If setting has been made so that camera-shake correction is to be carried out, in a step S23, the mechanical camera-shake correction is carried out in a step S24 and the control returns to the step S21. If the focal length f is not smaller than 40 mm in the step S21, whether the focal length f is smaller than 43.75 mm or not is determined in a step S25. If the focal length f is smaller than 43.75 mm, the electronic zooming processing is carried out in a step S26. If setting has been made so that camera-shake correction is to be carried out, in a step S27, the electronic camera-shake correction is carried out in a step S28 and the control returns to the step S21. If the focal length f is not smaller than 43.75 mm in the step S25, whether the focal length f is smaller than 525 mm or not is determined in a step S29. If the focal length f is smaller than 525 mm in the step S29, optical zooming actuation is carried out in a step S30. If the focal length f is not smaller than 525 mm, the electronic zoom processing is carried out in a step S31. If setting has been made so that camera-shake correction is to be carried out, in the step S27, the electronic camera-shake correction is subsequently carried out in the step S28 and the control returns to the step S21.

Figure 9:
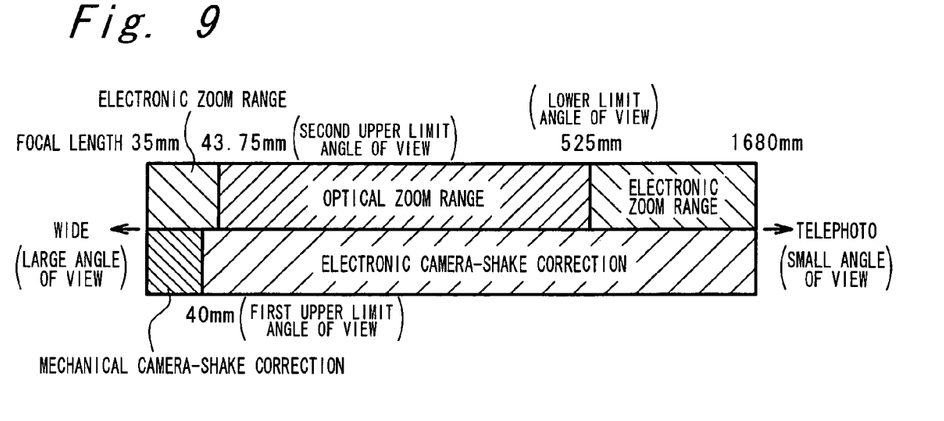
FIG. 9 is a diagram showing ranges of focal lengths of the digital camera of FIG. 8 in which ranges the zooming operations and the camera-shake correction methods are applied.

FIG. 9 shows ranges of focal lengths f resulting from the control of FIG. 8 in which ranges the zooming operations and the camera-shake correction methods are applied. In the embodiment, the mechanical camera-shake correction is applied when the focal length f is smaller than 40 mm (an angle of view of the effective image Ap corresponding to the value will be referred to as a first upper limit angle of view), or the electronic camera-shake correction is applied when the focal length f exceeds 40 mm. On the other hand, electronic zooming is carried out when the focal length f is smaller than 43.75 mm (an angle of view of the effective image Ap corresponding to the value will be referred to as a second upper limit angle of view), optical zooming is carried out in addition to electronic zoom processing with a ratio such that the focal length f is set at 43.75 mm only by electronic zooming when the focal length f is not smaller than 43.75 mm and smaller than 525 mm, or electronic zoom processing is carried out again when the focal length f is not smaller than 525 mm (an angle of view of the effective image Ap corresponding to the value will be referred to as a lower limit angle of view).

In the embodiment, the first upper limit angle of view (the focal length f=40 mm) is determined so that the ratio of the diagonal length Lp of the effective image Ap to the diagonal length Lo of the captured image Ao is the first ratio of 88%, as is the case with the second embodiment, and the lower limit angle of view (the focal length f=525 mm) is determined so that the ratio of the diagonal length Lp of the effective image Ap to the diagonal length Lo of the captured image Ao is the second ratio of 80%, as is the case with the first embodiment. The second upper limit angle of view (the focal length f=43.75 mm) is determined so that the ratio of the diagonal length Lp of the effective image Ap to the diagonal length Lo of the captured image Ao is the second ratio of 80% that is the same as the ratio for the determination of the lower limit angle of view when the magnification of the optical zoom unit for the captured image Ao is minimized.

The first ratio (88%) is a maximum ratio that ensures a margin for the shift of the position of the extraction of the effective image Ap so that camera-shake can sufficiently be corrected by electronic zooming when the magnification of optical zooming for the captured image Ao is minimized. The second ratio (80%) is a maximum ratio that ensures a margin for the shift of the position of the extraction of the effective image Ap so that camera shake can sufficiently be corrected by electronic zooming when the magnification of optical zooming for the captured image Ao is maximized.

In the embodiment, namely, the angle of view of an image to be recorded with which the ratio of the diagonal length Lp of the effective image Ap to the diagonal length Lo of the captured image Ao becomes the first ratio of 88% when the angle of view is adjusted by the electronic zoom unit with the minimized magnification of the optical zoom unit for the captured image Ao is determined as the first upper limit angle of view (f=40 mm). Thus the effective image Ap is recorded while camera shake is corrected by the mechanical camera-shake correction unit when the angle of view of the image to be recorded is larger than the first upper limit angle of view, or while camera shake is corrected by the electronic camera-shake correction unit when the angle of view of the image to be recorded is not larger than the first upper limit angle of view. Besides, the angle of view of an image to be recorded with which the ratio of the diagonal length Lp of the effective image Ap to the diagonal length Lo of the captured image Ao becomes the second ratio of 80% when the angle of view is adjusted by the electronic zoom unit with the minimized magnification of the optical zoom unit for the captured image Ao is determined as the second upper limit angle of view (f=43.75 mm), and the angle of view of an image to be recorded with which the ratio of the diagonal length Lp of the effective image Ap to the diagonal length Lo of the captured image Ao becomes the second ratio (80%) when the angle of view is adjusted by the electronic zoom unit with the maximized magnification of the optical zoom unit for the captured image Ao is determined as the lower limit angle of view (f=525 mm). Before recording, the angle of view of the effective image is adjusted by the electronic zoom unit when the angle of view of the image to be recorded is larger than the second upper limit angle of view, the ratio of the effective image Ap to the captured image Ao is fixed at the second ratio of 80% by the electronic zoom unit and the angle of view of the effective image Ap is adjusted by the optical zoom unit when the angle of view of the image to be recorded is not larger than the second upper limit angle of view and larger than the lower limit angle of view, or the captured image Ao is magnified into and fixed in a largest state by the optical zoom unit and the angle of view of the effective image Ap is adjusted by the electronic zoom unit when the angle of view of the image to be recorded is not larger than the lower limit angle of view.

In the embodiment, the mechanical camera-shake correction is applied when an angle of view of an image to be captured is larger than the first upper limit angle of view at which sufficient camera-shake correction cannot be carried out by the electronic camera-shake correction unit. Thus minimization of power consumption, relief from deterioration in resolution caused by electronic zooming, and recording of the effective image Ap without camera shake can be achieved without limitation for decreasing maximum angle of view.

When an angle of view of an image to be captured is large in the embodiment, the ratio of the diagonal length Lp of the effective image Ap to the diagonal length Lo of the captured image Ao is reduced to the second ratio (80%) with the largest possible angle of view with use of electronic zooming. When an angle of view of an image to be captured is in a range not larger than the second upper limit angle of view and larger than the lower limit angle of view, the resolution does not change because the angle of view is adjusted by optical zooming with the magnification of electronic zooming fixed. In this range, the ratio of the diagonal length Lp of the effective image Ap to the diagonal length Lo of the captured image Ao is fixed at the second ratio (80%). Thus a sufficient margin for the change in the position of the extraction of the effective image Ap can be ensured and the effective image Ap without camera shake can be recorded with electronic camera-shake correction, regardless of the magnification of optical zooming of the captured image Ao.

Figure 10:
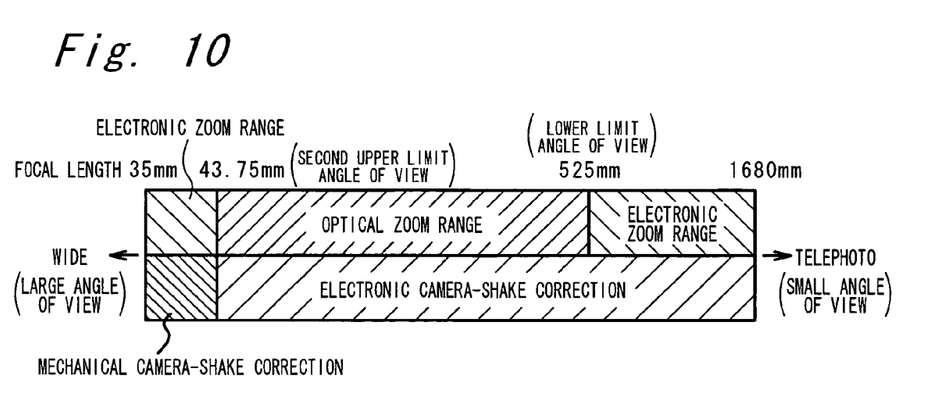
FIG. 10 is a diagram showing ranges of focal lengths of a digital camera in accordance with a fourth embodiment of the invention in which ranges the zooming operations and the camera-shake correction methods are applied.

FIG. 10 shows ranges in which zooming operations and camera-shake correction methods are applied in a fourth embodiment in which the first upper limit angle of view is made to coincide with the second upper limit angle of view in the third embodiment of FIG. 9. In the embodiment, the range of application of the mechanical camera-shake correction is slightly wider than that in the third embodiment, but yet the control is simplified because a number of divisions of condition according to the angle of view (the focal length f) may be smaller than that in the third embodiment.

Figure 11:
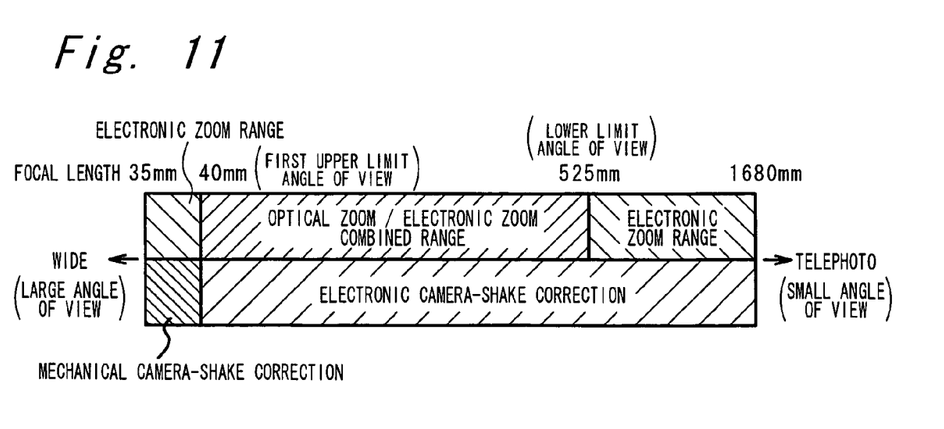
FIG. 11 is a diagram showing ranges of focal lengths of a digital camera in accordance with a fifth embodiment of the invention in which ranges the zooming operations and the camera-shake correction methods are applied.

FIG. 11 shows a fifth embodiment in which optical zooming is applied from the first upper limit angle of view wider than the angle in the third embodiment of FIG. 9. In the embodiment, images with slightly higher resolution than in the third embodiment can be recorded when optical zooming actuation is applied at wide angles. The embodiment, however, uses optical zooming from the angle of view at which sufficient correction can be carried out by the electronic camera-shake correction unit, only at wide angles, and therefore decrease in the angle of view by optical zooming results in insufficient amount of possible shift of the effective image Ap in electronic camera-shake correction. In the range where optical zooming actuation is applied (the range not larger than the first upper limit angle of view and larger than the lower limit angle of view) in the embodiment, a focal length f is set by optical zooming while the ratio of the diagonal length Lp of the effective image Ap to the diagonal length Lo of the captured image Ao is adjusted continuously from the first ratio (88%) to the second ratio (80%) by electronic zooming so as to be ratios preset corresponding to focal lengths f (angles of view of images to be recorded), in order that required amounts of shift of the effective image Ap may be ensured in accordance with different angles of view.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image capturing apparatus with an optical system composed of optical members for forming an image of a subject, the image capturing apparatus comprising:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus;

wherein the control unit adjusts the angle of view by optical zooming and records the effective image while carrying out camera-shake correction with use of the mechanical camera-shake correction unit until a magnification of the optical zoom unit for the captured image is maximized, and the control unit adjusts the angle of view by electronic zooming and records the effective image while carrying out camera-shake correction with use of the electronic camera-shake correction unit after until the magnification of the optical zoom unit for the captured image is maximized.

2. An image capturing apparatus with an optical system composed of optical members for forming an image of a subject, the image capturing apparatus comprising:

an optical zoom unit capable of changing an angle of view by movement of at least one optical member of the optical system;

an image capturing element for carrying out photoelectric exchange for the image of the subject formed by the optical system and thereby obtaining a captured image;

a recording unit for extracting an effective image from the captured image and recording the effective image;

an electronic zoom unit capable of changing an angle of view of the effective image by changing an area in which the effective image is extracted from the captured image;

a shake detection unit for detecting an amount of shake of the image capturing apparatus;

a mechanical camera-shake correction unit for moving at least one of the optical members of the optical system and the image capturing element on basis of the amount of shake detected by the shake detection unit and thereby correcting camera shake;

an electronic camera-shake correction unit for shifting a position where the effective image is extracted from the captured image and thereby correcting camera shake; and a control unit for controlling the image capturing apparatus, wherein the control unit corrects camera shake by the mechanical camera-shake correction unit and records the effective image when a ratio in size of the effective image to the captured image is larger than a given value, and the control unit corrects camera shake by the electronic camera-shake correction unit and records the effective image when the ratio in size of the effective image to the captured image is not larger than the given value.

3. An image capturing apparatus as claimed in claim 2, wherein the angle of view of the effective image is adjusted by the optical zoom unit and the effective image is recorded while camera shake is corrected by the mechanical camera-shake correction unit when the angle of view of the image that is to be recorded is large, and the angle of view of the effective image is further adjusted by the electronic zoom unit and the effective image is recorded only when a magnification of the optical zoom unit for the captured image is maximal.

4. An image capturing apparatus as claimed in claim 2, wherein the angle of view of the effective image is adjusted by the electronic zoom unit and the effective image is recorded when the angle of view of the image that is to be recorded is large, and the angle of view of the effective image is further adjusted by the optical zoom unit and the effective image is recorded while camera shake is corrected by the electronic camera-shake correction unit only when the area in which the effective image is extracted by the electronic zoom unit is minimal.

* * * * *